April 8, 1969　　　P. R. J. STEHLÉ　　　3,437,412
DEVICE FOR IMPARTING A PRESCRIBED ROTATION TO A LIGHT
DISPERSING ELEMENT OF AN OPTICAL SPECTRO-PHOTOMETER
Filed June 17, 1965
Fig. 1.
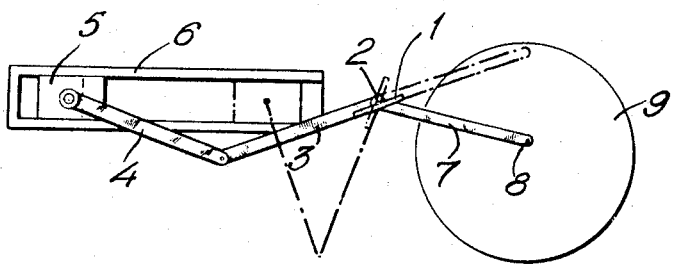
Fig. 2.
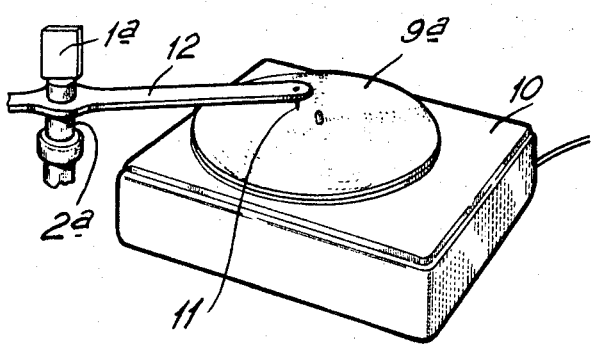
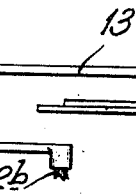
Fig. 3.
Fig. 4.
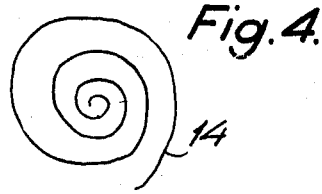

United States Patent Office 3,437,412
Patented Apr. 8, 1969

3,437,412
DEVICE FOR IMPARTING A PRESCRIBED ROTATION TO A LIGHT DISPERSING ELEMENT OF AN OPTICAL SPECTROPHOTOMETER
Pierre Raoul Joseph Stehlé, 5 Rue J.B.H. Lafolie, La Garenne, France
Filed June 17, 1965, Ser. No. 464,637
Claims priority, application France, June 22, 1964, 979,081
Int. Cl. G01j *3/00;* G02b *5/18*
U.S. Cl. 356—256                                    5 Claims

ABSTRACT OF THE DISCLOSURE

A device for controlling the rotation of a light dispersing element of a monochromator which is mounted on a shaft, in which an arm is rigidly connected to the shaft and carries a stylus which is engaged in a groove formed in a record which is placed on a turntable rotating at a constant and predetermined speed whereby the light dispersing element rotates at a prescribed rotation law as the stylus engages the groove.

---

In very high precision mechanisms having components which undergo a time-limited rotation, the various component parts require extremely accurate machining and very careful assembly in order to obtain the desired rotation in correspondence with one or more predetermined laws with a minimum of backlash and therefore of error.

Thus, in the case of prism or grating type optical spectrophotometers, the system used to rotate the prism or the grating must possess extremely accurate mechanical characteristics.

When exploring the spectrum, the prism or the grating must be rotated in correspondence with certain laws which depend, on the one hand, upon the properties of the prism or the grating used and, on the other, upon the required correlation between time and the wavelength furnished by the spectrophotometer. The conventional solution has been to use long fine-pitch screws in conjunction with carriages, linkage or lever systems, and the like. Such systems are complex to produce and require extremely accurate machining and assembly, in addition to which taking up any backlash that develops is very difficult.

Further, a specific monochromator model equipped with such a drive system can be used only for the specific law of rotation stipulated by the manufacturer, unless considerable mechanism modifications and fresh adjustments are resorted to.

It is the obect of the present invention to replace all these bulky, delicate and costly mechanical parts by a simpler and more accurate rotation imparting system which is easily adaptable to monochromators of the same kind and which, by a simple replacement requiring no adjustments, will enable the desired rotation law to be chosen instantly for the same monochromator.

The invention accordingly relates to a device for imparting controlled rotation to a shaft, which device consists of an arm which is rigid with said shaft and carries on its end a gramophone-type pickup member adapted to engage with a Gramophone record placed on a turntable and having a non-modulated groove cut thereon which reproduces the law of time-limited rotation to be imparted to said shaft.

The control record hereinbefore referred to may be manufactured by a method, including the steps of mounting, on a rotatable shaft driven by a mechanical compound, machined with the greatest possible accuracy whereby to impose upon said shaft a law of determinate time-limited rotation, an arm equipped at its end with a record cutting device, causing said shaft to be rotated over the entire range defined by said law and simultaneously cutting a record by means of said cutting device while at the same time adjusting the rotation speed of the record so that the cutting time corresponds to the time determined by said law, and of then reproducing this record in the customary way in as many copies as may be required. Thus, in the specific case of optical spectrophotometers, it is possible, using a plurality of such instruments having their prisms or gratings driven according to different laws by high-precision mechanical systems, to obtain sets of records that correspond to the several lays and can be used subsequently with the same optical spectrophotometer to enable the latter to be used in response to different laws.

The description which follows with reference to the accompanying non-limitative exemplary drawings will give a clear understanding of how the invention can be carried into practice.

In the drawings,

FIGURE 1 schematically illustrates a conventional device for imparting a rotation in terms of wavelength which is a linear function of time, to an optical spectrophotometer grating, and its association to the appurtenances required for cutting a record.

FIGURE 2 is a perspective view of the pickup means associated with a cut record for controlling the rotation of a monochromator grating in correspondence with to a given law.

FIGURE 3 is an alternative embodiment of the rotation controlling device of FIGURE 2; and FIGURE 4 shows on a greatly enlarged scale the non-modulated groove cut in a rotation controlling record.

As FIGURE 1 clearly shows, the monochromator grating 1 for optical spectrophotometers shown thereon is adapted to rotate through a limited angle about a shaft 2, in accordance with a given law, responsive to a lever 3 fixed to this shaft and connected through a link 4 to a slide 5 which is displaceable in any known manner along a slideway 6. In accordance with the present invention, the selected monochromator of this type is one that has been well adjusted and the means for imparting rotation to which has been designed with the greatest care. The shaft 2 supporting the grating 1 has fixed onto it an arm 7 carrying a device 8 for cutting Gramophone-type records, an example being long-playing records. The monochromator is then caused to be rotated over the full spectrum exploration range for which it was designed, while a record 9 is cut simultaneously by means of the cutting device, the rotation speed of the record being adjusted to correspond to the exploration time. After the master record has been cut, the customary method is used for reproducing it in an unlimited number of inexpensive copies.

In order to drive a new monochromator with its grating 1a, all that is necessary is to place the cut record 9a on a turntable 10 linked to the monochromator, and in this case it will be the record which will drive, through the stylus 11, a pickup arm 12 carrying the stylus and controlling the rotation of the shaft 2a of grating 1a onto which said arm is fixed.

Obviously, a plurality of exploration laws may be obtained by placing on the turntable a succession of different records which have previously been cut in accordance with the method described hereinabove by means of monochromators equipped with the corresponding conventional exploring devices.

By way of non-limitative examples of possible recordings of known spectrum-exploring characteristics may be cited systems providing rotations which are either a linear function of time with respect to wavelength, a linear function of time with respect to wave-number, a logarithmic function of time with respect to wavelength, or a linear function of time with respect to wavelength but at a low rate for intervals preselected according to any given law and a very high rate between those intervals. The advantages afforded by such a method are:

(a) reduced cost price for the drive system;
(b) the possibility of modifying the spectrum exploration law of the same instrument;
(c) the possibility of varying the exploration rate within the same selected rotation law, by replacing one record by another record cut to provide a faster or slower rate, this being independent of the speed variations obtainable by means of the turntable itself; and
(d) the possibility of exploring to a preset program when making routine studies of certain spectra.

This in turn provides a very wide range of possible scanning rates and displacement laws.

Without in any way departing from the scope of the invention it would be possible to provide on the same record a second groove which is independent of the rotational effect and to use this track in conjunction with a reference-pulse reading-head for identifying the wavelengths throughout the spectrum, these reference pulses being caused, for instance, to operate a pulse counter subsequent to amplification. Such a device will enable the grating position corresponding to an arbitrarily chosen wavelength to be fixed in advance. Furthermore, certain chosen spectrum lines could be identified separately and caused to operate an electric, luminous, audible or voice signal.

By way of example, this second track could be engraved on part of the other side of the record, or possibly even on a second record which is driven by the same rotation shaft as the motion controlling record and which is thereby synchronized as when cutting the faces.

This second track, or possibly even a third track, may be used synchronously with the spectrum scanning to servocontrol an interferometer linked to the spectrophotometer, in order for example to control thickness variations in a Fabry-Perot interferometer.

Similarly, this system for copying and reproducing mechanical motions referenced to different laws may be applied without departing from the spirit and scope of the invention to any machine or system for imparting motion linearly or not in terms of time, in which case, if the angle of rotation of the driven shaft is to exceed 50°, the angle can be increased in simple fashion by imparting the rotation through the medium of a crank-pin 13 supporting the needle 11 and fixed to the grating shaft 2b.

The precision of this motion will readily be appreciated when it is remembered that the pitch used for current records is of the order of one-tenth of a millimetre and that, since the groove is devoid of modulation, its depth can be greater and the weight of the driving pickup can also be increased to obtain the moment required to rotate the grating supporting pivot.

The only precaution to be observed in the course of manufacture is to ensure that the records run true, which involves no difficulty with present-day machining possibilities.

The spiral 14 formed by the groove, though irregular, corresponds to the required characteristic, and since the number of revolutions is large, the precision with which the arm 12 advances or the crank-pin 13 rotates is of a high order.

What is claimed is:

1. A device for controlling the rotation of a shaft, more particularly for rotating optical spectrophotometer light dispersing means, comprising in combination a turntable rotating at constant predetermined speed, a Gramophone-type record placed on said turntable, a groove cut without modulation on one side of said record whereby to reproduce the rotation law to be imposed on said shaft, light dispersing means mounted on said shaft, an arm rigidly connected to said shaft and Gramophone-type pickup means rigidly connected to said arm and engaging said groove, whereby said light dispersing means rotates in accordance with said rotation law as said pickup means engages said groove.

2. A device for controlling the rotation of a shaft as claimed in claim 1, comprising at least one additional groove on said record, said additional groove being cut independently of the rotating motion and being modulated to deliver identification and servo-control reference pulses.

3. A device for controlling the rotation of a shaft as claimed in claim 2, wherein said additional groove is cut on the other side of said record.

4. A device for controlling the rotation of a shaft as claimed in claim 1, comprising a second record coaxial with the first and rotated with it, and at least one track on said second record, which track is cut independently of the rotating motion and is modulated to generate identification and servo-control reference pulses.

5. A device for controlling the rotation of a shaft as claimed in claim 1, wherein said arm is a crank-pin.

References Cited

UNITED STATES PATENTS 3,020,794   2/1962   Reichel.
3,367,231   2/1968   Meinecke et al.

DAVID SCHONBERG, *Primary Examiner.*

T. H. KUSMER, *Assistant Examiner.*

U.S. Cl. X.R.

350—162; 178—7.6; 74—63; 356—100, 96